Nov. 26, 1957  T. C. KNUDSEN  2,814,515

SHAFT GRIPPING DEVICE

Filed Feb. 4, 1954

Inventor
Thomas C. Knudsen
by Egon W. Mueller
Attorney

United States Patent Office 2,814,515
Patented Nov. 26, 1957

2,814,515

SHAFT GRIPPING DEVICE

Thomas C. Knudsen, Cincinnati, Ohio, assignor to Allis-Chalmers Manufacturing Company, Milwaukee, Wis.

Application February 4, 1954, Serial No. 408,276

1 Claim. (Cl. 287—52.06)

This invention relates to a shaft gripping device, more particularly to a shaft gripping device for sheaves.

This invention is applicable to any shaft gripping application in which a sheave or the like must be fastened to the shaft. These shaft gripping devices are intermediaries in transmitting power from the shaft to the sheave or vice versa.

Constant effort is applied in the sheave making industry to make simpler and trouble free shaft gripping devices. As sheave sizes are standardized, the diameter of the sheave bears a definite relation to shaft size. The distance in between the shaft and the sheave allowed for the shaft gripping device is limited. The entire shaft gripping assembly must be placed in that limited space. Therefore, simplicity in design, minimum number of operating parts and trouble free operation are essentials of the needed shaft gripping assembly. Mounting a contractible sleeve concentrically on a contractible bushing is known in prior art. The present invention utilizes a simple part in minimum number and trouble free assembly for engaging and disengaging the bushing and sleeve.

Accordingly, an object of the present invention is to provide a simple and trouble free shaft gripping device.

Another object of this invention is to provide a shaft gripping device which is cheap to manufacture and easy to assemble the component parts.

Another object of the invention is to provide a shaft gripping device that is simple to adjust and gives trouble free operation.

Figure 1:
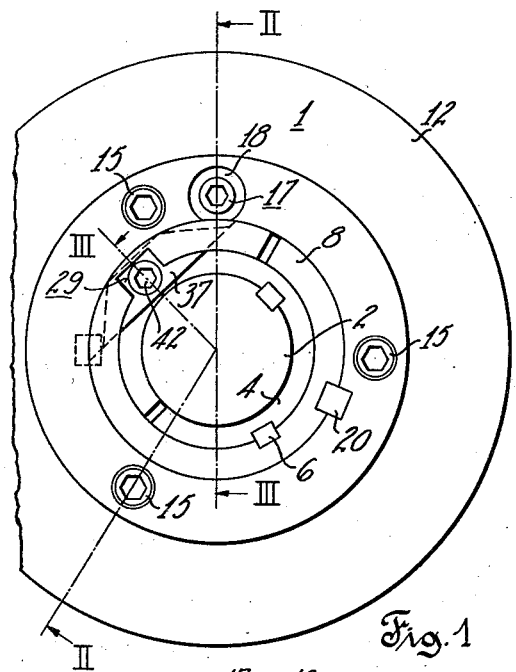
Fig. 1 is a partial end view of an adjustable sheave mounted on the shaft by the inventive shaft gripping device.
Figure 2:
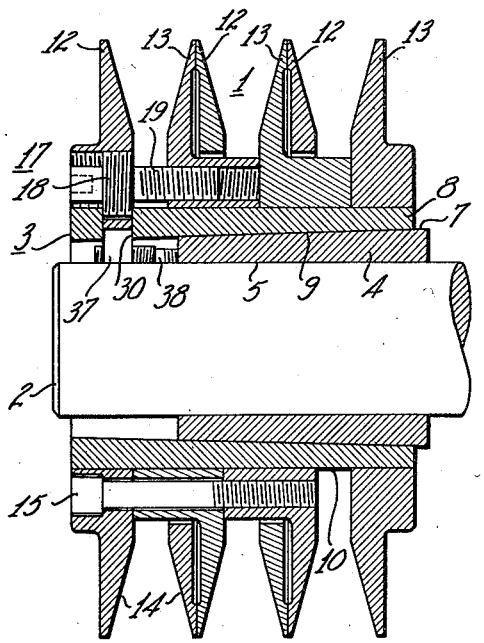
Fig. 2 is a view in cross section along the line II—II of Fig. 1.
Figure 4:
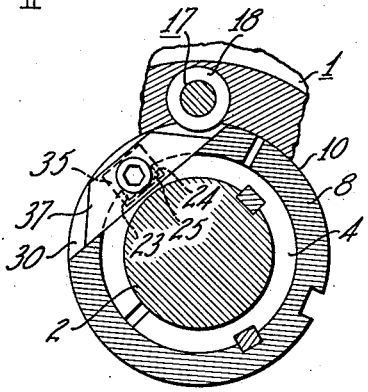
Fig. 4 is a cross sectional view taken along line IV—IV and having added thereto a fragmental portion showing the position of the sheave adjusting collar.

The sheave assembly 1 shown in Figs. 1 and 2 is mounted on a shaft 2 by shaft gripping device 3 including an axially split bushing 4. The bushing 4 presents an inner shaft engaging surface 5 to the shaft 2 for gripping the shaft 2 in frictional engagement. The bushing 4 has an outer tapered surface 7. Mounted on the outer tapered surface 7 is an axially split sleeve 8 whose inner tapered surface 9 is complementary to and coacts with the outer tapered surface 7. Power is transmitted between the two surfaces 7, 9 by frictional engagement and may include a key 6 therebetween.

Mounted on the outer cylindrical surface 10 of the sleeve 8 is the sheave assembly 1. The sheave assembly 1 includes two groups of adjustable pitch sheave disks comprising first disks 12 and second disks 13, respectively.

The first disks 12 and second disks 13 are coaxially mounted on the sleeve 8 of the shaft gripping device 3. The first and second disks 12, 13 face each other and cooperate with each other to present belt engaging surfaces 14. First disks 12 are bolted together by bolts 15 and second disks 13 are also bolted together in like manner, though not shown. The groups of disks 12, 13 are adjusted axially by the disk pitch varying means shown as the one piece screw 17 with a collar part 18 and a bolt part 19. The collar part 18 of the screw engages the group of first disks 12 and the bolt part 19 engages the group of second disks 13. The collar part 18 is anchored aginst axial movement by the sleeve 8. The entire sheave assembly 1 is keyed to sleeve 8 by a conventional key 20.

Figure 3:
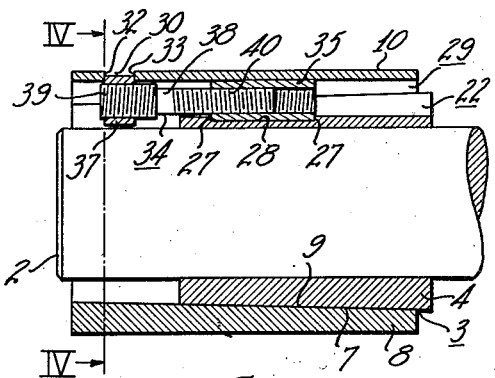
Fig. 3 is a fragmental view showing the inventive shaft gripping device in cross section along line III—III of Fig. 1.
Figure 5:
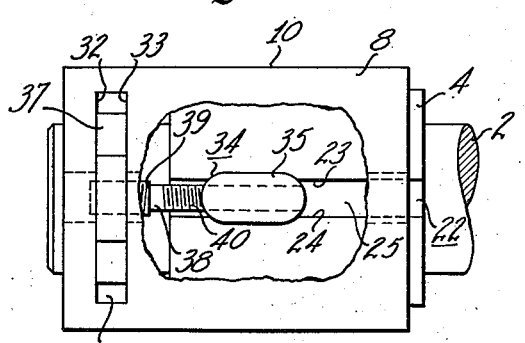
Fig. 5 is a fragmental view showing the position of the shaft gripping adjusting means.

The outer tapered surface 7 of the bushing 4 has an axially extending first slot 22 (as shown in Fig. 3). This first slot 22 may traverse only a part or all of the axial extent of the outer tapered surface 7 but is shown in Figs. 3 and 5 as being coextensive with the outer tapered surface 7. The first slot 22 may run parallel to the axis of the bushing 4 as shown or may be askew thereto and biasing the bushing 4. The first slot 22 has two axial parallel opposed surfaces 23, 24 and a third or bottom axial surface 25 which may be perpendicular to each of the opposed surfaces 23, 24. These surfaces 23, 24 and 25 may have any suitable configuration and are shown as flat surfaces although they may also be made as rounded or stepped surfaces. The third surface 25 has shoulders 27 defining a depression 28 therein. The depression 28 is spaced intermediate the axial extremities of the third surface 25.

The inner tapered surface 9 is interrupted by an axially extending second slot 29 which is coextensive with the axial dimension of the inner tapered surface 9. The sleeve 8 is provided adjacent one end thereof with a cross slot or receiver 30 intersecting the second slot 29 and having side walls 32, 33. The receiver 30 extends radially through part or all of the thickness of the sleeve 8 at the second slot 29. The first and second slots 22, 29 are complementarily opposed to each other.

Means coacting with the bushing 4 and the sleeve 8 for frictionally engaging and disengaging the tapered surfaces 7, 9 are shown generally by the numeral 34 and includes the parts hereafter enumerated. A bushing element 35 is anchored in the depression 28 of the outer tapered surface 7. The shoulders 27 forming the depression 28, restrict the axial movement of the bushing element 35. A sleeve element 37 is seated in the receiver 30 of the sleeve 8. The side walls 32, 33 of the receiver 30 hold the sleeve element 37 against axial movement. An axially extending screw 38 is provided with two oppositely threaded portions 39, 40 each located adjacent one of the extremities of the screw 38. Portion 39 is of predetermined diameter threadingly engaging the sleeve element 37. The other portion 40 has a diameter less than the predetermined diameter and threadingly engages the bushing element 35. The screw 38 is provided with different diameter threaded portions 39, 40 to permit insertion of the screw 38 through the sleeve element 37 toward the bushing element 35 for simultaneously threadingly engaging both sleeve and bushing elements 37, 35, respectively.

The screw 38 is accessible from one of the ends of the sleeve 8 and is provided with a hexagon head 42 adapted to receive an Allen wrench for actuation. The screw 38 is rotatable in one direction to cause the sleeve 8 to compressibly engage the bushing 4. This action causes the inner shaft engaging surface 5 to grip the shaft 2 in frictional engagement. The screw 38 is rotatable in the opposite direction to cause the bushing 4 to release the shaft 2.

The particular embodiment of the invention illustrated and described herein is illustrative only and the invention includes such other modifications and equivalents as may readily appear to those skilled in the art, within the scope of the appended claim.

It is claimed and desired to secure by Letters Patent:

In a device for gripping a shaft, the combination comprising: an axially split bushing having an inner shaft engaging surface and an outer tapered surface; an axially split sleeve mounted on said bushing and having an inner tapered surface complementary to and coacting with said outer tapered surface of said bushing; said outer tapered surface of said bushing having a first slot having two opposed surfaces and a bottom surface, said bottom surface having shoulders defining a depression therein spaced intermediate the extremities of said bottom surface; said inner tapered surface being interrupted by an axially extending second slot coextensive with the axial dimension of said inner tapered surface, said sleeve being provided adjacent one end thereof with a receiver intersecting said second slot and having side walls, said receiver extending radially through the thickness of said sleeve at said second slot; and means coacting with said bushing and said sleeve for frictionally engaging and disengaging said outer tapered surface and said inner tapered surface comprising; a bushing element anchored in said depression of said outer tapered surface, said shoulders restricting axial movement of said bushing element, a sleeve element seated in said receiver of said sleeve, said side walls holding said sleeve element against axial movement, an axially extending screw having two oppositely threaded portions, each portion being adjacent one of the extremities of said screw, one of said portions threadingly engaging said sleeve element and the other of said portions threadingly engaging said bushing element, said screw being accessible from one end of said sleeve and rotatable in one direction to cause said sleeve to compressively engage said bushing to cause said inner shaft engaging surface to grip said shaft and said screw being rotatable in the opposite direction to cause said bushing to release said shaft.

References Cited in the file of this patent
UNITED STATES PATENTS 2,571,699   Firth ------------------ Oct. 16, 1951
2,648,988   Knudsen -------------- Aug. 18, 1953

OTHER REFERENCES

Page 211 of Product Engineering, September 1952.